March 15, 1927.　　　　　　　　　　　　　　　1,621,032
E. B. SHAND
COMMUTATION OF SYNCHRONOUS CONVERTERS
Filed April 11, 1922

WITNESSES:
R. J. Fitzgerald
O. B. Buchanan

INVENTOR
Errol B. Shand.
BY
Wesley G. Carr
ATTORNEY

Patented Mar. 15, 1927.

1,621,032

UNITED STATES PATENT OFFICE.

ERROL B. SHAND, OF PITTSBURGH, PENNSYLVANIA, ASSIGNOR TO WESTINGHOUSE ELECTRIC & MANUFACTURING COMPANY, A CORPORATION OF PENNSYLVANIA.

COMMUTATION OF SYNCHRONOUS CONVERTERS.

Application filed April 11, 1922. Serial No. 551,538.

My invention relates to methods and means for improving the commutation of commutating dynamo-electric machines and it has particular reference to rotary converters.

The object of my invention is to compensate for the variable effects produced by the wattless component of the alternating current flowing in the armature of a rotary converter.

Another object of my invention is to compensate for the effect of variations in the angular position of the rotor of a rotary converter with regard to its effect upon the armature reaction in the commutating zone.

With these and other objects in view, my invention consists in the methods and apparatus hereinafter disclosed and specifically recited in the appended claims.

Figure 1:
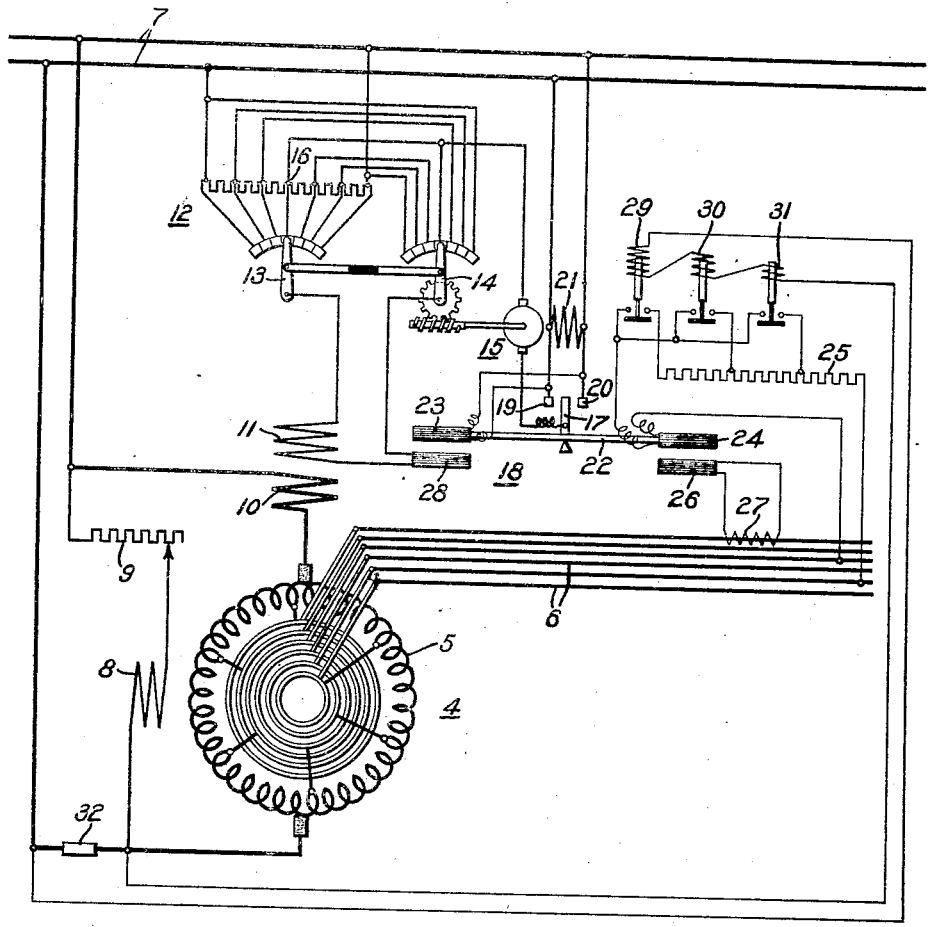
Figure 2:
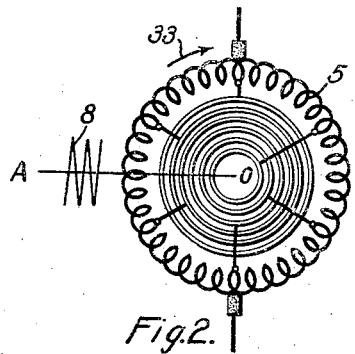
Figure 3:
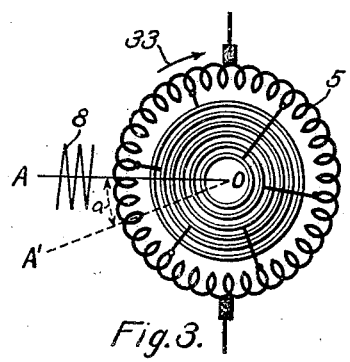

Referring to the accompanying drawing for a better understanding of my invention, Fig. 1 is a diagrammatic view of circuits and apparatus embodying my invention in what is believed to be a preferred form, and Figs. 2 and 3 are diagrammatic views illustrating the changes in the position of the rotor with varying loads.

I have found that the application of a load to a rotary converter causes an angular displacement of the rotor with respect to its no-load position, the angular displacement varying approximately with the load. It, therefore, follows that the wattless component of current, instead of exerting its magnetomotive force wholly against or with that of the exciting field, will have a component along the interpole axis. This will produce an effect on the commutating pole fluxes, either increasing or decreasing them, depending upon the phase angle of lead or lag of the reactive component.

My invention, generally stated, therefore, is built up upon the idea of effecting a compensation varying both with the rotor position and with the reactive component.

In Fig. 1 is shown a rotary converter 4 having an armature 5 which is connected to an alternating-current line 6 and to a direct-current line 7. The converter is also provided with three field windings, to wit: an exciting winding 8 which is connected across the direct-current line through a rheostat 9, a series commutating field winding 10 and an auxiliary commutating field winding 11.

The auxiliary winding 11 is excited from a double-dial rheostat 12 having its terminals connected across the direct-current line 7 and having movable arms 13 and 14 connected to the respective terminals of said winding 11. The position of the movable arms 13 and 14 is controlled by means of a direct-current motor 15 having one brush terminal connected to the mid-point 16 of the rheostat 12 and having the other brush terminal connected to a switch arm 17 of a controlling element 18, said switch arm 17 being adapted to engage either the one or the other of two stationary contact members 19 and 20 which are connected, respectively, to the direct-current line 7. The field winding 21 of the motor 15 is shown permanently connected across the direct-current main 7.

The switching device 18 comprises a rocking arm 22 which controls the position of the contact member 17, and a pair of movable coils 23 and 24 which are mounted on the respective ends of said rocking arm. The coil 24 is energized across two of the conductors of the alternating-current line 6, and it cooperates with a stationary coil 26 which is energized from a current transformer 27 in one of the leads of the alternating-current line 6 in such manner that the attraction or repulsion of the coils 24 and 26 develop a torque proportional to the wattless component of the alternating current as the latter lags or leads with respect to the alternating voltage. The other movable coil 23 is constantly energized from the direct-current mains and is repelled or attracted by a juxtaposed stationary coil 28 which is connected in series with the auxiliary commutating field winding 11.

A variable resistance 25 is connected in series with the coil 24 or in the circuit of any of the other coils 23, 26 and 28, and it is automatically controlled by means of any form of current-responsive device, such as a plurality of serially connected relays 29, 30 and 31 which are energized from a current shunt 32 in one of the direct-current supply conductors. The relays 29 to 31 are designed to cooperate successively, as indicated by the difference in the number of turns thereof, to respond to different load conditions of the rotary converter, in the manner hereinbefore indicated as necessary for perfect compensation.

The effect of an alteration in the angular position of the rotor will be understood by reference to Figs. 2 and 3. Since the field produced by the alternating currents flowing in the armature of the rotary converter rotates backwardly at synchronous speed, it is held stationary in space. Under no-load conditions, as depicted in Fig. 2, a south pole of the armature will be substantially underneath a north pole of the field magnet excitation and the relative positions of the stator and rotor fluxes at unity power factor may be indicated by a single line OA.

Under load conditions, with the armature rotating in the direction of the arrow 33, the armature will drop back by an angle $a$, which is approximately proportional to the load or load-current, so that the field excitation will be represented by the line OA and the alternating-current armature reaction at 100% power factor at the sliprings will be represented by the line OA'. If it were not for the angular displacement $a$, the effect of wattless currents flowing in the armature 5 would be either to increase or to decrease the excitation of the machine along the axis OA, as is well understood. When the armature is displaced by an angle $a$, therefore, there will be a component of the armature reaction proportional to sin $a$ in the direction of the center line of the interpoles, thus tending to change the flux in the commutating zone.

In the relay device 18 shown in Fig. 1, I have provided means whereby the coils 23, 28 develop a torque proportional to the current in the auxiliary commutating field winding 11, said torque being balanced against a torque developed by the coils 24, 26 proportional to the wattless component of the alternating current, the last named proportionality being varied, in accordance with the load, by means of the variable resistor 25 and the load-responsive relays 29 to 31. The adjustments of the relative numbers of turns of the load-responsive relays 29 to 31 and of the steps of the variable resistor 25 are such that the effectiveness of the wattless-current responsive coils 24, 26 is varied substantially in proportion to the sine of the angle $a$, as above described.

While I have shown a specific type of step-by-step current-responsive mechanism excited from a current shunt 32 in series with one of the direct-current lines, it is obvious that I am not limited to a step-by-step mechanism, as any other type of current-responsive device could be employed, and it could be serially coupled to the direct-current line in any other manner, as by being connected across the series commutating field winding 10 instead of the special current shunt 32. In like manner, it is obvious that the rocking-arm relay 17 could be replaced by an oscillating-type relay, or any other means could be employed for adjusting the excitation of the auxiliary commutating winding 11 substantially in accordance with the product of the wattless component of the alternating current and a sine function of the load.

It will be obvious, therefore, that many changes and substitutions of equivalents may be made by those skilled in the art without departing from the essential features of my invention, and I do not desire to be limited to the specific construction shown except in so far as may be required by the language of the appended claims when read in the light of the prior art.

I claim as my invention:

1. The method of improving the commutation of a rotary converter which consists in maintaining a commutating field having a component which varies in response to the product of a function of the wattless component of the alternating current and a function of the load.

2. The method of improving the commutation of a rotary converter which consists in producing a component of commutating-field excitation which varies in response to the total load current and producing another component of commutating-field excitation which varies in response to the product of a function of the wattless component of the alternating current and a function of the load.

3. The method of improving the commutation of a rotary converter which consists in adding increments of commutating-field ampere-turns which vary in a predetermined manner in accordance with variations in the wattless component of the alternating current and altering said predetermined manner of variation in response to the load.

4. The method of improving the commutation of a rotary converter which consists in producing a component of commutating-field excitation which is substantially proportional to the wattless component of the alternating current, and altering said proportionality in accordance with another variable of the machine.

5. The method of improving the commutation of a rotary converter which consists in producing a component of commutating-field excitation having increments which are substantially proportional to the wattless component of the alternating current, and altering said proportionality in accordance with a function of the load.

6. The method of improving the commutation of a rotary converter which consists in providing a component of commutating-field ampere-turns and varying said component in a predetermined manner to compensate for variations in the angular displacement of the rotating field of the armature member relative to the field member.

7. The method of improving the commutation of a rotary converter which consists in adding increments of commutating-field ampere-turns which vary in a predetermined manner in accordance with variations in a disturbing factor, said factor introducing variable components of armature-reaction and having a variable effectiveness dependent upon the angular displacement of the rotating field of the armature member relative to the field member, and altering said predetermined manner of variation in response to the load.

8. The method of improving the commutation of a rotary converter which consists in producing a component of commutating-field excitation which is substantially proportional to the product of the wattless component of the alternating current and a function of the load.

9. The method of improving the commutation of a rotary converter which consists in maintaining a commutating field having a component which varies substantially in proportion to the load current and having another component which varies substantially in proportion to the product of the wattless component of the alternating current and the sine of the angle of displacement of the rotating field of the armature member relative to the field member.

10. The combination with a rotary converter, of mechanism for improving the commutation thereof, said mechanism comprising automatic means for maintaining a commutating field having a component which varies in response to the product of a function of the wattless component of the alternating current and a function of the load.

11. The combination with a rotary converter, of mechanism for improving the commutation thereof, said mechanism comprising automatic means for producing a component of commutating-field excitation which varies in response to the total load current, and automatic means for producing another component of commutating-field excitation which varies both in response to the wattless component of the alternating current and in response to the load.

12. The combination with a rotary converter, of mechanism for improving the commutation thereof, said mechanism comprising means for providing a component of commutating-field ampere-turns, automatic means for adding increments to said component in a predetermined manner in accordance with the wattless component of the alternating current, and automatic means for altering said predetermined manner of variation in response to the load.

13. The combination with a rotary converter, of mechanism for improving the commutation thereof, said mechanism comprising automatic means for producing a component of commutating-field excitation which is substantially proportional to the wattless component of the alternating current, and automatic means for altering said proportionality in accordance with another variable of the machine.

14. The combination with a rotary converter, of mechanism for improving the commutation thereof, said mechanism comprising automatic means for producing a component of commutating-field excitation which is substantially proportional to the wattless component of the alternating current, and automatic means for altering said proportionality in accordance with a function of the load.

15. The combination with a rotary converter, of mechanism for improving the commutation thereof, said mechanism comprising means for providing a component of commutating-field ampere-turns, and automatic means for varying said component in a predetermined manner to compensate for variations in the angular displacement of the rotating field of the armature member relative to the field member.

16. The combination with a rotary converter, of mechanism for improving the commutation thereof, said mechanism comprising means for providing a component of commutating-field ampere-turns, and automatic means for varying said component in a predetermined manner in response to variations in the angular displacement of the rotating field of the armature member relative to the field member.

17. The combination with a rotary converter, of mechanism for improving the commutation thereof, said mechanism comprising means for providing main and auxiliary components of commutating-field ampere-turns, automatic means for varying said auxiliary component in a predetermined manner in accordance with variations in a disturbing factor, said factor introducing variable components of armature-reaction and having a variable effectiveness dependent upon the angular displacement of the rotating field of the armature member relative to the field member, and automatic means for altering said predetermined manner of variation in response to the load.

18. The combination with a rotary converter, of mechanism for improving the commutation thereof, said mechanism comprising automatic means for producing a component of commutating-field excitation substantially proportional to the product of the wattless component of the alternating current and a function of the load.

19. The combination with a rotary converter, of mechanism for improving the commutation thereof, said mechanism comprising means for providing a component of commutating-field ampere-turns, and automatic means for varying said component in a predetermined manner in accordance with the product of the wattless component of the alternating current and a function of the load.

20. The combination with a rotary converter, of mechanism for improving the commutation thereof, said mechanism comprising electro-responsive means for maintaining a commutating field having a component which varies substantially in proportion to the load current and having another component which varies substantially in proportion to the product of the wattless component of the alternating current and the sine of the angle of displacement of the rotating field of the armature member relative to the field member.

21. The combination with a rotary converter having an armature member and a plurality of field windings, at least one of said windings being a commutating winding, of electro-responsive means for energizing said commutating winding substantially in proportion to the wattless component of the alternating current, and automatic means for altering said proportionality in accordance with another variable of the machine.

22. The combination with a rotary converter having an armature member and a plurality of field windings, at least one of said windings being a commutating winding, of electro-responsive means for energizing said commutating winding substantially in proportion to the wattless component of the alternating current, and automatic means for altering said proportionality in accordance with the sine of the angle of displacement of the rotating field of the armature member relative to the field member.

23. The combination with a rotary converter having an armature member and a plurality of field windings, at least one of said windings being a commutating winding, of electro-responsive means for energizing said commutating winding substantially in proportion to the wattless component of the alternating current, and automatic means for altering said proportionality in accordance with a function of the load.

24. The combination with a rotary converter having an armature member and a plurality of field windings, at least one of said windings being a commutating winding, of electro-responsive means for energizing said commutating winding substantially in proportion to the product of the wattless component of the alternating current and the sine of the angle of displacement of the rotating field of the armature member relative to the field member.

25. The combination with a rotary converter having an armature member and a plurality of field windings, at least two of said windings being commutating windings, of means for energizing one of said commutating windings substantially in proportion to the load current, and means for energizing the other of said commutating windings substantially in proportion to the product of the wattless component of the alternating current and the sine of the angle of displacement of the rotating field of the armature member relative to the field member.

26. The combination with a rotary converter having a commutating field winding, of means for exciting said commutating field comprising a current-controlling device having an element responsive to the wattless component of the alternating current taken by said rotary converter, and means for varying the responsiveness of said element.

27. The combination with a rotary converter having a commutating field winding, of means for exciting said commutating field comprising a current-controlling device having an element responsive to the product of a function of the load current and the departure of the wattless current from a predetermined value.

28. The combination with a rotary converter having a commutating field winding, of means for varying the field produced by said commutating field winding, and means for controlling said last-mentioned means comprising an element having coils energized by the alternating voltage and alternating current of said converter so as to be responsive to the wattless component of the alternating current, and means for, in effect, varying the impedance of the circuit of one of said coils.

29. The combination with a rotary converter having a commutating field winding, of means for varying the field produced by said commutating field winding, and means for controlling said last-mentioned means comprising an element having coils energized by the alternating voltage and alternating current of said converter in such manner as to be responsive to the wattless component of the alternating current, a balancing element having a coil energized by the current flowing through said commutating field winding, and means for, in effect, varying the impedance of the circuit of one of said coils.

30. The combination with a rotary converter having a commutating field winding, of means for varying the field produced by said commutating field winding, and means for controlling said last-mentioned means comprising an element having coils energized by the alternating voltage and alternating current of said converter in such manner as to be responsive to the wattless component of the alternating current, a balancing element having a coil energized by the current flowing through said commutating field winding, and a coil energized by direct current, and means for, in effect, varying the impedance of the circuit of one of said coils.

31. In combination, alternating-current mains, direct-current mains, a rotary converter connected thereto and having a commutating field winding, a double-dial rheostat having arms and being connected across said direct-current mains, said commutating field winding being connected to said arms of said rheostat, means for controlling said double-dial rheostat comprising a contact-making device having an element responsive to the wattless component of the alternating current taken by said rotary converter, and means for varying the responsiveness of said element.

32. The combination with a rotary converter having a commutating field winding, of means for varying the field produced by said commutating field winding, and means for controlling said last-mentioned means comprising two differentially connected electro-responsive elements, one of said elements being responsive to the excitation of said commutating field winding and the other of said elements being responsive to the alternating-current power factor of the converter, and variable-impedance means for varying the effectiveness of one of said elements.

33. The combination with a rotary converter having a commutating field winding, of means for varying the field produced by said commutating field winding, and means for controlling said last-mentioned means comprising two differentially connected electro-responsive elements, one of said elements being responsive to the excitation of said commutating field winding and the other of said elements being responsive to the alternating-current power factor of the converter, variable-impedance means for varying the effectiveness of one of said elements, and means responsive to the load current for controlling said variable-impedance means.

34. The combination with a double-current machine having a single armature provided with a commutator and slip rings, of means for providing a commutating field excitation, power-factor responsive means for adding increments to said field, and load-responsive means for varying the increments of said power-factor responsive means.

35. The method of improving the commutation of a double-current commutator machine, at least one of said currents being alternating, which consists in providing a commutating field excitation, causing increments to be added to said field in a predetermined manner in response to power-factor changes and causing said manner of variation to be changed with changes of load.

36. The method of improving the commutation of a double-current commutator machine, at least one of said currents being alternating, which consists in providing a commutating field excitation and causing said field to be varied in substantial proportion to the product of the total wattless currents circulating in the machine and a sine function of the load.

37. The combination with a double-current commutator machine, at least one of said currents being alternating, of means for providing a commutating field excitation, and electro-responsive means for varying said excitation in substantial proportion to the product of the total wattless currents circulating in the machine and a sine function of the load.

38. The combination with a rotary converter, of electro-responsive means for automatically maintaining a component of commutating-field excitation which is substantially proportional to the product of the wattless current flowing in the armature and the sine of the angle of lag of the rotor with respect to its no-load position.

In testimony whereof, I have hereunto subscribed my name this 7th day of April, 1922.

ERROL B. SHAND.